Inventor:
Richard L. Smirl
By: Joseph W. Malleck Atty.

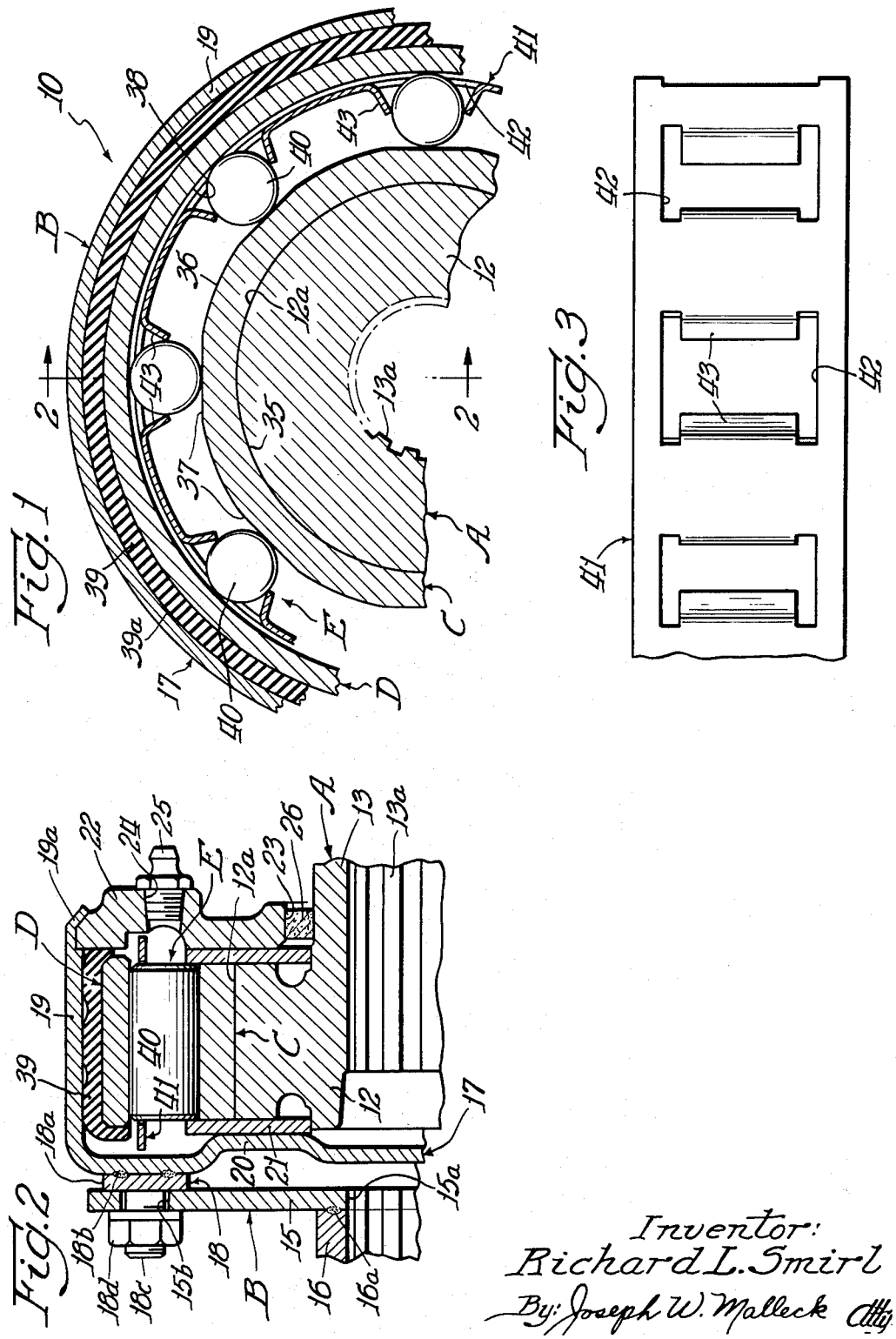

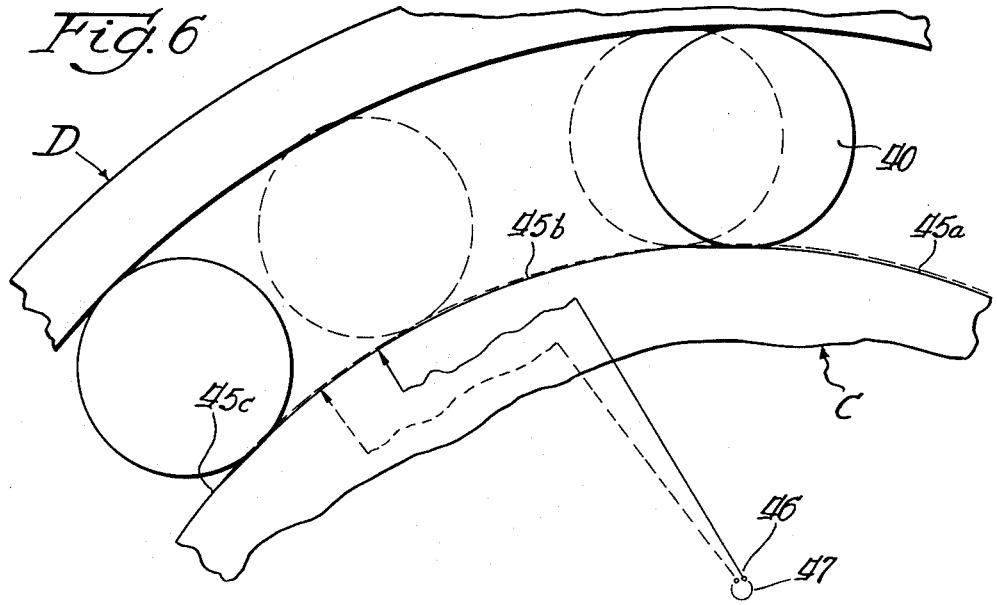
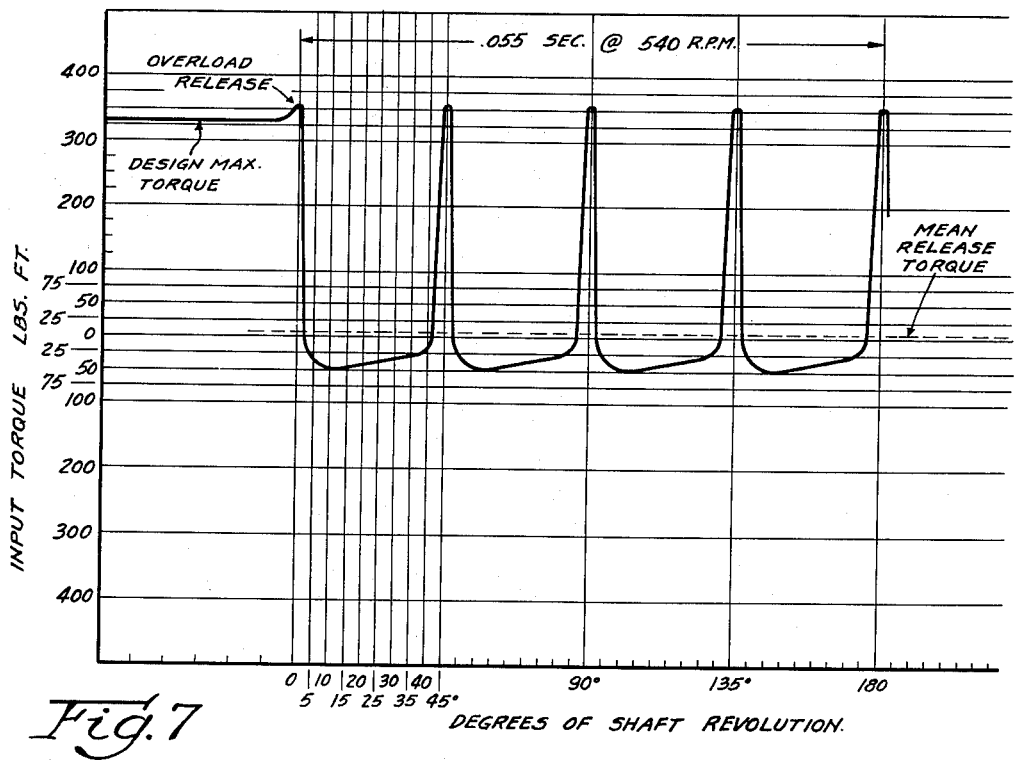

Sept. 7, 1965    R. L. SMIRL    3,204,430
TORQUE LIMITING DEVICE
Filed Aug. 30, 1963    4 Sheets-Sheet 4

Inventor:
Richard L. Smirl
By: Joseph W. Malleck

United States Patent Office 3,204,430
Patented Sept. 7, 1965

3,204,430
TORQUE LIMITING DEVICE
Richard L. Smirl, La Grange Park, Ill., assignor to Borg-Warner Corporation, Chicago, Ill., a corporation of Illinois
Filed Aug. 30, 1963, Ser. No. 305,654
1 Claim. (Cl. 64—28)

The present invention relates to an overload device and more particularly to an overload clutch having concentrically disposed races with roller bearings in continuous contact between said races.

A primary object of this invention is to provide an improved device which is adapted to generate little or no heat during the overload condition.

Another object of this invention is to provide an overload clutch which has substantially reduced wear than that experienced by known devices.

Yet another object of this invention is to provide an overload clutch which can be more accurately calibrated to unload at more precise conditions.

A more particular object of this invention is to provide an overload clutch having concentrically disposed cylindrical races each drivingly connected to an input or output member and having roller bearings disposed therebetween, said roller bearings being urged by camming surfaces disposed on at least one of said races upon relative movement between said races and said outer race being adapted to be distorted by said cammed bearings permitting said roller bearings to circulate between said races while in continuous contact therewith when a predetermined overload condition is reached.

Yet another object of this invention is to provide an overload clutch having reversible characteristics while at the same time obviating the heat generation and wear problems normally experienced by prior art overload clutches.

Yet another object of this invention is to provide an overload clutch of the type having concentrically disposed races with a plurality of roller bearings therebetween, said clutch being particularly characterized by a camming surface comprised of a series of cylindrical surfaces each having centers disposed on circle, said camming surface being adapted to urge said roller bearings radially outwardly against a distortable outer race, said outer race permitting said roller bearings to circulate therebetween when a predetermined overload condition is reached, said outer race having a resilient backing to aid in returning said outer race to a normally unflexed condition.

FIG. 1 is a fragmentary central sectional view of an overload clutch device;

FIG. 2 is a sectional view taken substantially along line 2—2 of FIG. 1;

FIG. 3 is an enlarged fragmentary top view of the roller bearing cage;

FIG. 6 is a greatly enlarged sectional view of the races and roller bearings therebetween illustrating an alternative embodiment and showing various operative positions of the roller bearings;

FIG. 7 is a graphical illustration like that in FIG. 5 but depicting the operation of the construction of FIG. 6.

Figure 4:
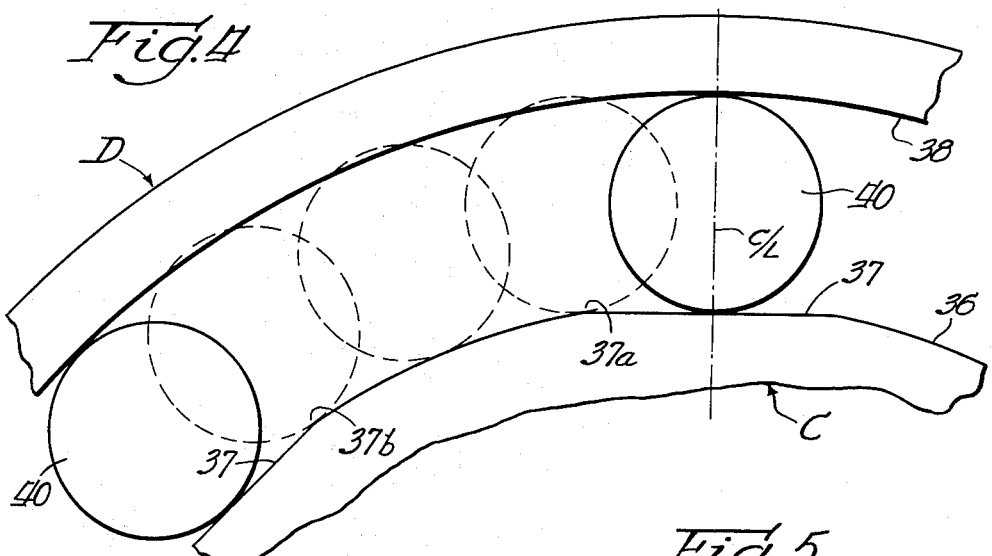
FIG. 4 is a greatly enlarged sectional illustration of the overload clutch races and roller bearings therebetween, said bearings being illustrated in various positions of operation.

Turning now to the drawings and more specifically to FIGS. 1–5, there is illustrated a preferred embodiment, generally indicated 10, comprising a rotatable input member A and a rotatable output member B with concentrically disposed races C and D disposed between said members; roller bearing means E placed between said races for transmission of torque are adapted to circulate when a predetermined overload condition is experienced.

The input member A more particularly comprises an annular hub 12 integrally formed at one end of a sleeve 13; the sleeve is provided with internal splines 13a for a suitable driving connection to the drive shaft. The hub 12 carries a circular cylindrical outer surface 12a and is machined to a close tolerance to receive inner race C in tight fit.

The output member B comprises a flat annular hub plate 15 having a central opening 15a aligned with a sleeve hub 16 which is joined to the hub plate, such as by resistance welding at location 16a. An annular cover 17 is mounted to the hub plate 15 by means of guide pins 18 having a head 18a disposed between the cover and the hub plate and is resistance welded to the cover at 18b; the guide pins have shanks 18c extending through the hub plate openings 15b and are secured by nuts 18d. The cover has an annular flange 19 disposed at its most radially outward extent adapted to serve as a housing and also as means for receiving the torque from the input member. The cover also has an annular indented rib 20 adapted to serve as a bearing surface for the thrust washer 21 disposed between the cover and the rotary input member A. An annular rear flange 2 has a central opening 23 through which the sleeve 13 of the input member extends; the rear flange is adapted to be held by the terminating lip 19a of the cover flange 19 and completes the housing for enclosing the races C and D and bearing means E. The rear flange 22 has a lubrication opening 24 provided with a nipple 25 to receive a lubrication charge mechanism. Seal means 26 is disposed between the wall of opening 33 of the rear flange and the sleeve 13 for sealing therebetween during operation.

The inner race C is formed as a circular cylindrical sleeve or tubing, having an inner cylindrical surface 35 adapted to be press-fit with the hub surface 12a and rotate therewith. The race C has an outer race surface 36 which is substantially of circular cylindrical shape having flat lands 37 formed thereon at regular spaced circumferential intervals. The land surfaces are disposed perpendicular to a radius of the hub 12 and are arranged so that they form only a slight deviation from the circular cylindrical surface 36. The inner race C is non-distortable and may be formed of suitable metal having sufficient hardness to withstand the pressure of the roller bearing means E which will bear against said surfaces 36 and land 37. In the preferred embodiment, there are eight equally spaced lands formed on said race.

The outer race D is formed with a circular cylindrical shape having an inner race surface 38 against which the bearing may work. The outer race is adapted to be distortable under pressure of said roller means E and is adapted to transmit torque of the cover 17 by way of a cylindrical pad 39 disposed therebetween. The pad 39 is comprised of elastomeric material such as Buna "N" rubber and has corrugations formed on the outer surface 39. The pad 39 stores energy when the outer race is flexed or distorted under the action of the roller means E and aids in returning the race D to its unflexed condition as permitted by the means E.

The roller bearing means E comprises a plurality of cylindrical rollers 40 each having their axis disposed parallel to the axis of rotation of the device; there is provided a roller for each of said lands 37. The rollers 40 are maintained in circumferential spaced relationship by an annular cage 41 having openings 42 provided at spaced intervals through which the rollers 40 may protrude. Each of the openings 42 have depending flanges 42 adapted to cradle and engage the mid-sections of rollers to align them for proper operation. The cage is slightly spaced from the outer race D.

To provide for transmission of torque between said races, the rollers 40 are adapted to roll along the lands upon relative rotation of the input member and output member. The spacing between the center of each land and the outer unflexed race is substantially equal to the diameter of each roller. Thus, as the rollers are urged to roll to one side of the land, they will be cammed outwardly and thereby distort the outer race causing pad 39 to grip the outer cover 19 and transmit torque. If the output member should experience a load which would cause the input member to rise above a predetermined torque value, the outer race is calibrated so that rollers will move to the end of the lands and up along the cylindrical outer surface 36 of the inner race and consecutively on to each of the lands while circulating around the space between the races until the load condition is relieved.

Figure 5:
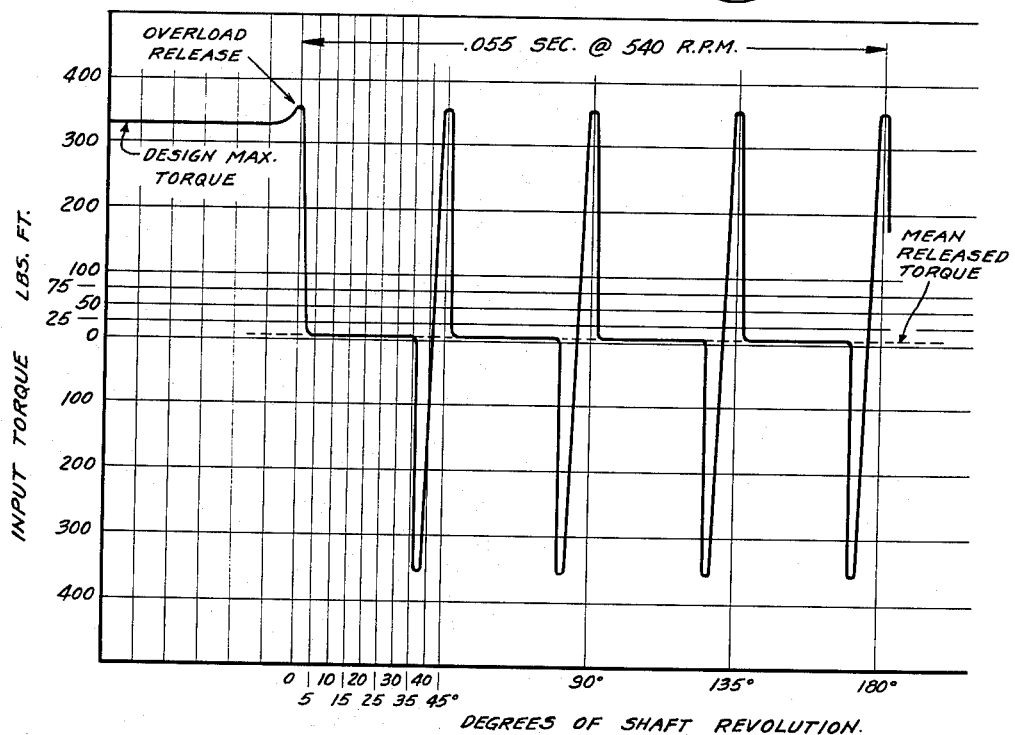
FIG. 5 is a graphical illustration plotting input torque of the clutch device against the degree of the shaft revolution, for the construction illustrated in FIG. 1.

The input torque will experience a cycling during such overload condition as illustrated in the chart of FIG. 5. As there shown, if the input torque rises above the maximum design torque a sufficient increment, the roller bearings will skip over the edge 37a of the land reducing the input torque almost instantaneously to zero while the roller continues on toward the next land; the input torque will assume a negative value as the roller bearing proceeds from the beginning edge 37b of the next land toward the center (C/L) thereof and then pass through zero torque again. The left-hand portion of the land will again serve as a camming means for the roller, whereupon the input torque will rise to the overload value and begin a new cycle. During this overload condition, the rollers 40 are in constant and continuous contact with each of the races while experiencing no frictional wear or heat generation that will effect the device. The transmitted torque during the overload condition will have a mean value of zero.

In the construction of FIGS. 1–5, the device may be operated in the reverse rotatable direction and provide the same overload characteristics. This is due to the symmetrical arrangement of the lands with respect to a radius passing through the center of the land.

Turning now to FIGS. 6 and 7 wherein an alternative arrangement is illustrated. Here, instead of the symmetrical equally spaced flat lands of the preferred embodiment, the inner race has cylindrical surfaces 45a, 45b, 45c, etc, arranged in a progressive series about the outer surface thereof, each surface having a center 46 lying on a common circle 47 and circumferentially offset from other centers. Thus, as the rollers are caused to cam outwardly toward the outer race, the input torque rises gradually for a quarter turn of the shaft, like that in FIG. 7. After having reached the highest point of the camming surface, it will then skip over to the next cylindrical segment and begin a gradual outward camming over a new cycle. In this type of arrangement, the device is not reversible in rotative direction. The cylindrical segments of the race surface can be considered as unsymmetrical with respect to the medium point of each segment.

Figure 8:
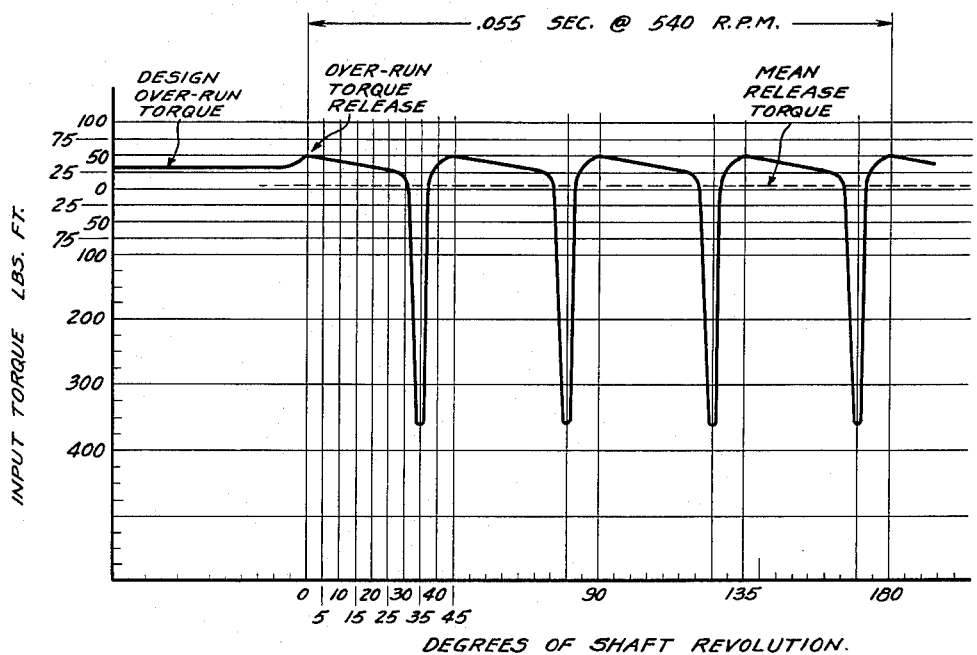
FIG. 8 is a graphical illustration like that in FIGS. 5 and 7, but depicting the operative characteristics of a construction reversed from that of FIG. 6.

In FIG. 8, the torque vs. shaft revolution curve depicts the over-running characteristic of the construction of FIG. 6 with the camming surfaces 45 reversed in direction and disposition of incline.

While I have described my invention in connection with a certain preferred construction arrangement and alternative embodiments, it is to be understood that this is by way of illustration and not by way of limitation, that the scope of my invention is defined solely by the appended claim which should be construed as broadly as the prior art will permit.

I claim:

An overload clutch, comprising: a rotatable input member carrying an annular race having an outer surface provided with a plurality of equispaced radial ramps; a rotatable output member having an interior wall concentrically arranged about said input member and internally carrying a resilient thin metallic race therein with an annular elastomeric ring drivingly interconnecting the interior wall of said output member and said resilient race; and a plurality of cylindrical rollers interposed between said races in continuous engagement therewith, whereby upon rotation of said input member said rollers will be cammed radially outwardly to drive said outer race, said resilient race being effective to yield radially outwardly and locally about said cammed rollers a sufficient distance upon the occurrence of a predetermined overload condition to permit said rollers to circulate between said races, thereby preventing rotative drive between input and output members until the predetermined overload condition is removed.

References Cited by the Examiner

UNITED STATES PATENTS

| | | | |
|---|---|---|---|
| 1,953,430 | 4/34 | Parre | 64—29 |
| 2,668,426 | 2/54 | Hoover | 64—29 |
| 2,775,326 | 12/56 | Better et al. | 64—29 |
| 2,819,635 | 1/58 | Better et al. | 64—28 |
| 2,983,121 | 5/61 | Nass | 64—29 |

FOREIGN PATENTS 876,592  9/61  Great Britain.

ROBERT C. RIORDON, *Primary Examiner.*